United States Patent [19]

Lin

[11] Patent Number: 5,700,557

[45] Date of Patent: Dec. 23, 1997

[54] UNSATURATED POLYESTER AND THE MANUFACTURING METHOD THEREOF

[76] Inventor: Li-Ching Lin, No. 57, Lane 131, Haipu Road, Hsinchu, Taiwan

[21] Appl. No.: 760,475

[22] Filed: Dec. 5, 1996

[51] Int. Cl.[6] .................... B32B 3/26; C08K 3/00
[52] U.S. Cl. .................... 428/312.4; 522/24; 524/5; 524/413; 524/425; 524/437; 524/442; 524/446; 524/560; 523/205; 523/206; 428/319.7; 428/325; 428/331; 252/186.1; 252/186.26; 106/708; 106/709; 106/711
[58] Field of Search ................... 522/24; 524/5, 524/413, 425, 437, 446, 560, 442; 523/205, 206; 428/312.4, 319.7, 325, 331; 252/186.1, 186.26; 106/708, 709, 711

[56] References Cited

U.S. PATENT DOCUMENTS 3,630,237  12/1971  Varnell et al. ............... 138/176
4,115,336   9/1978  Crouzet ........................ 260/29.6

*Primary Examiner*—Samuel A. Acquah
*Attorney, Agent, or Firm*—Beveridge, DeGrandi, Weilacher & Young LLP

[57] ABSTRACT

A composition for producing an unsaturated polyester is provided. The composition comprises an unsaturated polyester resin; cement; sand; bleaching agent; and curing agent.

10 Claims, No Drawings

UNSATURATED POLYESTER AND THE MANUFACTURING METHOD THEREOF

BACKGROUND OF THE INVENTION

This invention relates to a composition for producing unsaturated polyester and a manufacturing method thereof. In particular, this invention provides a composition having an unsaturated polyester resin; cement; sand; bleaching agent; and curing agent.

In the present day, unsaturated polyester is typically used to produce consumer goods, such as Christmas decorations or flower pots. The unsaturated polyester used is made by mixing unsaturated polyester resin a, promoter agent and curing agent. The promoter agent used is cobalt salt. The weight ratio of the curing agent and the blend of unsaturated polyester resin and the promoter agent is 3:200. With the prior product, the character of the curing agent and the promoter agent used are unstable and flammable. These two agents should be deposited separately to prevent explosion. Furthermore, the amount of the promoter added is 0.5 kg per 45 kg of the mixture of the unsaturated polyester resin and curing agent. Due to the toxic promoter used, the final product is poison. The unsaturated polyester produced cannot be widely used.

The purpose of this invention is to provide a composition for producing unsaturated polyester which overcomes the disadvantages of the prior product. The present composition reduces the amount of the promoter used and therefore, decreases the toxicity of the final product.

SUMMARY OF THE INVENTION

This invention provides a composition for producing an unsaturated polyester. This composition is composed of an unsaturated polyester resin, cement, sand, bleaching agent and curing agent. The weight ratio of the curing agent and the mixture of unsaturated polyester resin, cement, sand and bleaching agent is from 300:1 to 500:1. The bleaching agent used titanium dioxide ($TiO_2$). The curing agent is selected from the group consisting of methyl ethyl ketone peroxide (MEKPO), dimethyl phthalate (DMP) and cyclohexanone peroxide (CHPO). Perferably, the weight ratio of the curing agent and the mixture of unsaturated polyester resin, cement, sand and bleaching agent is 400:1.

This invention further provides a method for preparing unsaturated polyester. The present method comprises the steps of: a. preparing a blend of unsaturated polyester resin, cement, sand and bleaching agent; b. mixing the blend of step a with curing agent, wherein the weight ratio between said blend and curing agent is from 300:1 to 500:1; and c. exposing the mixtures to curing conditions. The bleaching agent used in the present method is titanium dioxide. The curing agent is selected from the group consisting of methyl ethyl ketone peroxide (MEKPO), dimethyl phthalate (DMP) and cyclohexanone peroxide (CHPO). Preferably, the weight ratio between said blend and curing agent is 400:1.

EXAMPLE

Unsaturated polyester resin is mixed with cement and sand to form a 2 kg blend. 1 g of titanium dioxide is added to the blend. After further mixing the blend with 5 g of methyl ethyl ketone peroxide, the final product is poured into a mold. The final product obtained does not have any chap.

I claim:

1. An unsaturated polyester composition consisting essentially of:
   an unsaturated polyester resin;
   cement;
   sand;
   a bleaching agent; and
   a curing agent.

2. The composition as defined in claim 1, wherein the weight ratio of said curing agent to a mixture of said unsaturated polyester resin, cement, sand and bleaching agent is from 300:1 to 500:1.

3. The composition as defined in claim 1, wherein said bleaching agent is titanium dioxide ($TiO_2$).

4. The composition as defined in claim 2, wherein said curing agent is selected from the group consisting of methyl ethyl ketone peroxide (MEKPO), dimethyl phthalate (DMP) and cyclohexanone peroxide (CHPO).

5. An unsaturated polyester composition consisting essentially of
   an unsaturated polyester resin;
   cement;
   sand;
   a bleaching agent, and
   a curing agent
   wherein the weight ratio of said curing agent to a mixture of said unsaturated polyester resin, cement, sand and bleaching agent is from 300:1 to 500:1;
   said bleaching agent is titanium dioxide ($TiO_2$); and
   said curing agent is selected from the group consisting of methyl ethyl ketone peroxide (MEKPO), dimethyl phthalate (DMP) and cyclohexanone peroxide (CHPO).

6. An unsaturated polyester composition consisting of:
   an unsaturated polyester resin;
   cement;
   sand;
   a bleaching agent; and
   a curing agent.

7. The composition as defined in claim 6, wherein a weight ratio of said curing agent to a mixture of said unsaturated polyester resin, cement, sand and bleaching agent is from 300:1 to 500:1.

8. The composition as defined in claim 6, wherein said bleaching agent is titanium dioxide ($TiO_2$).

9. The composition as defined in claim 6, wherein said curing agent is selected from the group consisting of methyl ethyl ketone peroxide (MEKPO), dimethyl phthalate (DMP) and cyclohexanone peroxide (CHPO).

10. The composition as defined in claim 6, wherein a weight ratio of said curing agent to a mixture of said unsaturated polyester resin, cement, sand and bleaching agent is from 300:1 to 500:1;
   wherein said bleaching agent is titanium dioxide ($TiO_2$); and
   wherein said curing agent is selected from the group consisting of methyl ethyl ketone peroxide (MEKPO), dimethyl phthalate (DMP) and cyclohexanone peroxide (CHPO).

* * * * *